United States Patent [19]

Marquardt et al.

[11] 4,039,696
[45] Aug. 2, 1977

[54] SOY LIPID-PROTEIN CONCENTRATE

[75] Inventors: Robert F. Marquardt, Danville, Calif.; Grant H. Hartman, Jr.; Kenneth C. Goodnight, Jr., both of Evansville, Ind.

[73] Assignee: Mead Johnson & Company, Evansville, Ind.

[21] Appl. No.: 673,165

[22] Filed: Apr. 2, 1976

[51] Int. Cl.$^2$ .............................................. A23C 11/00
[52] U.S. Cl. .................................... 426/598; 426/431; 426/655
[58] Field of Search ........................ 426/598, 431, 655

[56] References Cited

U.S. PATENT DOCUMENTS

| 1,444,812 | 2/1923 | Thevenot | 426/598 |
|---|---|---|---|
| 3,288,614 | 11/1966 | Miles | 426/311 |
| 3,399,997 | 9/1968 | Okumura | 426/598 |

FOREIGN PATENT DOCUMENTS 82,574  1/1967  Japan .................................... 426/598

OTHER PUBLICATIONS

Mustakas, "A New Soy Lipid-Protein Concentrate for Beverages", Cereal Science Today, Feb. 1974, pp. 62-73.

Nelson, A. I. et al. "Illinois Process for Preparation of Soymilk", Journal of Food Science, vol. 41, pp. 57-61 1976 — article accepted 8/20/75.

Primary Examiner—Joseph M. Golian
Attorney, Agent, or Firm—R. E. Carnahan; R. H. Uloth

[57] ABSTRACT

A process is described by means of which whole soybeans are converted into a milk-like product which is bland in flavor, has functionality characteristics similar to cow's milk, and which has a substantially reduced proportion of soybean carbohydrate. The process involves a combination of blanching, wet grinding, homogenizing, centrifuging, and heat treating steps.

28 Claims, No Drawings

SOY LIPID-PROTEIN CONCENTRATE

FIELD OF THE INVENTION

The present invention relates to food or edible material processes involving cooking or blanching of whole seed or beam material with homogenization and separation of carbohydrate constituents.

DESCRIPTION OF THE PRIOR ART

The following references deal with the preparation of soy milk and employ some of the same unit processes which are employed in the process of the present invention.

1. D. B. Hand, et al., "Pilot Plant Studies on Soy Milk" Food Technology, December, 1964, pages 139-142.
2. C. P. Miles, "Process of Producing Milk from Soybeans" U.S. Pat. No. 3,288,614, patented Nov. 29, 1966.
3. G. C. Mustakas, et al., "Production of Vegetable Protein Beverage Base", U.S. Pat. No. 3,639,129, patented Feb. 1, 1972.
4. G. C. Mustakas, "A New Soy Lipid-Protein Concentrate for Beverages", Cereal Science Today, February, 1974, pages 62-73.
5. G. C. Mustakas, "Process for Obtaining Full Fat Oil Seed Protein Beverages", U.S. Pat. No. 3,809,771 patented May 7, 1974.
6. A. I. Nelson, et al., "Soybean Beverage and Process", U.S. Pat. No. 3,901,978 patented Aug. 26, 1975.
7. A. I. Nelson, et al., "Illinois Process for Preparation of Soy Milk", Journal of Food Science, 41, 57–61 (1976).

Reference No. 1 is concerned with the preparation of dried soy milk. Dried soy milk is defined as including soy preparations which are readily dispersible in water and contain both fat and protein. One process disclosed involves soaking dry whole soybeans overnight in tap water, wet grinding the soaked beans, filtering through a plate and frame filter press, heat treating for 10 minutes at 250° F., and then evaporating and drying.

Reference No. 2 involves the preparation of soy milk from soy flakes by dry cracking and dehulling of soybeans, and passage thereof through flaking rolls under heavy pressure; suspension of the soy flakes in water followed by the addition of a phosphate or sequestering agent stabilizer; pressure cooking; homogenizing; clarifying in a centrifical separator; and formulating with other ingredients to prepare a milk-like product.

Reference No. 3 is concerned with the conversion of soybean flour into a dried powder which forms a stable milk-like suspension when mixed with water. The flour is dispersed in water to form a slurry, the particle size of the slurry is then reduced by wet milling, the wet milled slurry is mechanically homogenized, and the resulting emulsion is spray dried.

References No. 4 and No. 5 are similarly concerned with the preparation of a beverage from full fat soy flour. A lipid-protein concentrate is prepared by acid cook of soy flour at pH 3.5, collection of the curd by centrifugation, redispersion thereof in water at pH 9.0 followed by further cooking; mechanical homogenization; and neutralization. The resulting liquid is a lipid-protein concentrate beverage base which may be formulated with additional ingredients or spray dried.

References No. 6 and No. 7 deal with the so-called Illinois process for preparing soy milk. The process involves soaking whole soybeans to tenderize them; boiling with dilute sodium bicarbonate solution to inactivate trypsin inhibitor and the lipoxygenase enzyme; wet grinding; and homogenizing to form a bland stable aqueous dispersion of whole soybeans.

SUMMARY OF THE INVENTION

The present invention involves the conversion of clean whole soybeans into a liquid soybean lipid-protein concentrate which is suitable for food use by formulation with other ingredients to provide liquid dietary or milk-like products, and which is useful as an ingredient for meat, cereal, egg, and milk products. It may be used as much or dried to give a pulverulent soybean lipid-protein concentrate.

The present process employs clean dry whole soybeans which are selected to avoid beans which have been broken or bruised since it is believed that the undesirable flavor referred to as painty or beany which is usually associated with soybean products forms when the oil of the raw soybean is exposed to air. Accordingly, the beans are treated with care and are subjected at the outset to blanching in a dilute aqueous alkaline solution near the boiling point for a brief period which is sufficient to inactivate the lipoxygenase enzymes. The beans are then optionally dehulled, the dehulled bean or the whole blanched bean is wet milled, and the slurry is homogenized to give a fine suspension of specified particle size. From this point, one and optionally two further operations are involved which substantially improve the functional and nutritional qualities of the product. The optional step is high-temperature short-time heat treatment at a temperature of about 220°–300° F. for 2 min. to 15 sec. which substantially improves the functional characteristics of the lipid-protein concentrate with respect to viscosity, suspendability, and color. This may either precede or follow centrifugal fractionation of the homogenized soybean suspension which is a basic feature of the process since the nutritional quality of the product depends upon it to a significant extent.

A substantial proportion of the indigestible carbohydrate and particulate non-nutritional entities are removed by centrifugal fractionation under specific conditions employing a disc-type desludging centrifuge or a continuous solid bowl centrifuge which separates the concentrate into a light liquid fraction, the primary soybean lipid-protein concentrate, and a sludge fraction which contains at least 20%, preferably 30 to 40%, and up to about 60% by weight of the carbohydrate contained in the original raw beans. The sludge contains a small fraction of the protein contained in the treated soybeans and may be used for animal feed. Alternatively, it may be reworked by resuspending in water, preferably with homogenization, and centrifugal fractionation in the same fashion as the original soybean material. The reworked sludge at this point is substantially reduced in protein content. The liquid secondary soybean lipid-protein concentrate obtained may be combined with the primary soybean lipid-protein concentrate obtained in the first centrifugation step, and the resulting combined soybean lipid-protein concentrate may be used as such, dried, or formulated with other ingredients.

DESCRIPTION OF SPECIFIC EMBODIMENTS

Blanching, Hydration, or Extraction

The dry, clean soybeans are subjected to hot aqueous alkaline blanching for a relatively short period of time. This treatment hydrates the outer layers of the bean, extracts readily soluble constituents, particularly minerals and undesirable oligosaccharides, initiates disintegration of the bean, achieves inactivation of undesirable enzyme activity, particularly lipoxygenase activity, and destroys anti-nutritional factors present in the raw soybean. The efficiency of protein extraction in subsequent steps is also improved. The whole soybeans are added to 2.5 times the bean weight of hot water containing sodium hydroxide at a concentration of about 0.25% by weight. The amount of water is not critical but the 2.5 weight ratio is convenient. Lesser amounts from about 1.5 times the bean weight to greater amounts up to about 5 times the bean weight may be employed. The concentration of sodium hydroxide or other edible alkali is selected to afford pH 11–14, and preferably pH 12–13. The mixture is slowly agitated while it is heated near the boiling point, 200°–212° F. A 15-minute heating period is preferred.

Experiments were run to optimize the duration of the hydration step employing 2.5 times the bean weight of hot water containing 0.25% sodium hydroxide. Heating periods of 10, 15, and 20 minutes were employed and the composition of the drained beans was measured. The results obtained are shown in Table A.

Table A.

| Effect of Blanching Duration | | | |
|---|---|---|---|
| | 10 min. | 15 min. | 20 min. |
| Carbohydrate in blanched bean | 27–31% | 26% | 23% |
| Protein recovery* | 61% | 75% | 77% |

*Yield to finished soybean lipid-protein concentrate based on raw bean value.

Carbohydrate removal was increased as the time of extraction increased, and the protein yield to finished product was improved as the blanching time was increased. A blanching or extraction period of 15 minutes was considered sufficient when considering cost and technical factors. Blanching, hydration, or extraction under the selected conditions removed approximately 17% of the carbohydrate and 25% of the inorganic constituents reported as ash on analysis of the drained whole beans. The drained beans had the composition on a weight percent basis shown in Table B.

Bean Dehulling and Hull Separation

Dehulling is an optional step in the present process, but it is employed in a preferred embodiment thereof. It is advantageous organoleptically to separate and remove the hull tissue, and the subsequent desludging step is facilitated if the hulls are removed. Soybean lipid-protein concentrates of lower carbohydrate content are obtained when a dehulling step is employed. In any event, dehulling is done only after the wet heating or blanching step in order to avoid the formation of undesirable flavors due to operation of the lipoxygenase enzymes, which are inactivated in the blanching step. Dehulling of the wet beans may be accomplished by contacting the wet beans between the brushes of a stationary and moving brush arrangement which sweeps the hulls off the cotyledons. A columnar flotation apparatus in which an upwardly flowing stream of water floats the separated hulls away from the mass of beans is used for removal of hulls from the mass of cotyledons.

The composition of the dehulled beans after draining in shown in Table B.

Table B.

| Bean Composition After Blanching and Dehulling | | | | |
|---|---|---|---|---|
| | Blanched Beans | | Dehulled Beans | |
| Constituent | Composition* | Yield From Whole Bean % | Composition* | Yield From Whole Bean % |
| Solids | 35.60 | 91.01 | 36.10 | 90.81 |
| Protein | 15.25 | 96.04 | 17.75 | 108.54 |
| Carbohydrate | 13.71 | 83.16 | 9.34 | 70.59 |
| Fat | 5.07 | 97.80 | 7.63 | 95.05 |
| Ash | 1.57 | 75.68 | 1.38 | 64.38 |

*percent by weight

In addition to removal of the hulls, the flotation separation technique accomplishes further extraction and removal of soluble carbohydrate and ash forming constituents. Little loss of desired protein or lipid constituents occurs.

Bean Disintegration

Breakdown of the blanched beans or of the blanched and dehulled cotyledons in a water vehicle to form a bean slurry is the object of this operation. It has been found that disintegration of the beans to a small particle size is necessary to solubilize or liberate the desired protein and lipid constituents from the matrix of the intact bean. Disintegration of the beans to yield a slurry or suspension having a maximum particle size of 100 microns is preferred. It was further found that disintegration is best accomplished in an aqueous medium containing 10% bean solids. The aqueous medium is heated to near the boiling point to provide maximum effectiveness in the mill and homogenizer. Heating also serves to effect further enzyme inactivation. Little change in the composition of the bean solids occurs during this step. Excessive disintegration of the bean material, for instance to the sub micron stage, might conceivably interfere with the subsequent centrifugal fractionation step, but this has not been encountered experimentally.

The beans are preferably first ground in a Reitz-Type comminuting mill to provide slurry of bean particles which is then passed through a two-stage homogenizer operated at 3,000 psig on the second stage. Two or three passes through the homogenizer may be employed. The data shown in Table C compares protein recovery with the number of passages through the homogenizer. A point of diminishing returns is reached after the second passage through the homogenizer and accordingly two passages are preferred as part of the standard operating procedure.

Table C.

| Effect of Repeated Homogenization | |
|---|---|
| Number of Passages | Protein Yield |
| 1 | 68% |
| 2 | 75% |
| 3 | 77% |

Centrifugal Fractionation

The object of this step is the removal of the higher density relatively insoluble materials from the solubilized protein and lipid constituents. It was found that the solids concentration in the suspension fed to the centrifuge is the variable which has the greatest influence on the protein yield. A feed suspension containing from 3–6% by weight of solids, and preferably 5%, has been found suitable. Other factors evaluated were temperature, flow rate of feed, speed of the centrifuge, etc. A desludging centrifuge, or a continuous solid bowl centrifuge or decanter is employed. Such centrifuges are operated in the range of 2,000 to 12,000 xG for the present fractionation purpose. This separates the homogenized soybean lipid-protein suspension into a light liquid effluent, which is the product of the process, called the primary soybean lipid-protein concentrate, and a viscous pasty stream which is referred to as sludge. The latter contains significant amounts of protein and may be employed as an animal feed. Alternatively, it may be reworked by resuspension in water, rehomogenization, and recentrifugation in order to recover the protein therefrom and increase the overall protein yield of the process. Sludge rework is particularly desirable when the optional dehulling step is omitted.

Sludge rework involves combining the sludge with approximately 1 to 3 parts by weight of water per part by weight of sludge and recycling the suspended sludge through the homogenizer. The resulting homogenized sludge suspension is then fed to the desludging centrifuge in the same way as was used in preparation of the primary soybean lipid protein concentrate and the light stream from the centrifuge is designated the secondary soybean lipid-protein concentrate. It may be combined with the primary soybean lipid-protein concentrate to give a combined base. The protein yield in this step can be increased from about 60% relative to the protein content of the raw soybean when a single desludging step is employed to about 80% when sludge rework is employed. More of the soybean carbohydrate is, however, carried through to the product.

The exact conditions of centrifugation are adjusted to result in separation of a sludge containing 20% to 60% of the original soybean carbohydrate, preferably at least 30% thereof, and desirably 30% to 40% thereof. The specific G force, percent solids in slurry feed, and feed rate will depend upon the specific apparatus employed.

It has been found that when using a disc-type desludging centrifuge, dilution of the soybean suspension from the disintegration step to 5% solids improves the efficiency of centrifugal fractionation. In Table D the protein yield in the fractionation step is related to the percent solids contained in the soybean suspension fed to the desludging centrifuge. It is evident that optimal centrifugal removal of non-proteinaceous material occurred when a soybean suspension containing 5% by weight of solids was employed.

Table D.

| Centrifugal Fractionation | |
|---|---|
| % By Weight Solids | Protein Yield |
| 15% | 20% |
| 10% | 61% |
| 5% | 70% |
| 1% | 65% |

The relationship of feed solids to protein yield may be different with different centrifugation equipment, and it is recommended that this variable be evaluated with respect to the specific equipment employed in any given operation.

High-Temperature Short-Time Heat Treatment

It is preferred to include at a convenient stage in the process at a point subsequent to the disintegration step a high-temperature short-time heat treatment which serves to improve the functionality of the resulting soybean lipid-protein concentrate. By functionality is meant the compatibility of the concentrate with other food ingredients, its storage stability, reduced viscosity, and its appearance with respect to suspendability, and color. High-temperature short-time heat treatment also improves the stability of the product to heat sterilization conditions. A period of 30 seconds within the temperature range of 280°-290° F. is preferred, but heat treatments within the ranges of 220°-300° F. for 2.0 to 0.25 minutes, the longer times being employed at the lower temperatures, are acceptable.

The protein coefficient of the primary lipid-protein concentrate produced according to the foregoing steps including blanching, dehulling, disintegration, fractionation, and heat treatment is 0.83. The combined lipid-protein concentrate produced by a sequence in which dehulling is omitted but sludge rework is employed has a protein coefficient of about 0.76. The protein coefficient is defined as the ratio of the protein content to the sum of the protein content and carbohydrate content of the soybean product. The protein coefficient of dehulled soybeans and of soy flour is 0.56. It is thus evident that the composition of the soybean lipid-protein concentrate produced by the process of the present invention is substantially improved with regard to that of the raw soybeans or of soy flour. The increase in protein coefficient is particularly relevant when it is considered that the soybean carbohydrate includes indigestible oligosaccharides which frequently result in flatulence when soybeans or soy flour are consumed. Both the macrocarbohydrates and the oligosaccharides are substantially removed by the present process. A soybean lipid-protein concentrate having a protein coefficient of about 0.8 is preferred for use in food products such as meat, bread and other baked goods as well as for use in the preparation of a beverage.

EXAMPLE 1 — STANDARD PROCESS

Step 1

Dry, clean whole soybeans, a convenient quantity, e.g. 100 lbs. (1 part by weight) are slowly agitated with 30 gals. of water (2.5 parts by weight) containing 0.25% by weight of sodium hydroxide (pH 12.8) at or near the boiling point (ca. 200° F) for 15 minutes. The cook water is then drained and discarded. Approximately 17% of the carbohydrate and 25% of the ash-forming constituents of the beans are removed by this operation, but only about 4% of the protein and 2% of the fat are lost. The weight composition of the drained cooked beans is about 35.6% solids, 15.3% protein, 13.7% carbohydrate, 5% fat, and 1.6% ash. Values for ash reported herein are determined by ignition in the air.

Step 2

The moist beans are then dehulled in an apparatus involving a pair of scrub brushes between which the moist beans pass in such a manner that the softened hulls are swept off the cotyledons. The separated hulls are then removed in a columnar flotation apparatus in which an upwardly moving stream of water causes the separated hulls to float free of the mass of cotyledons and carries them off through an overflow outlet. Dehulling results in removal of a part of the undesirable carbohydrate with little loss of the desired protein and fat. The weight composition of the drained dehulled beans is typically 36.1% solids, 17.8% protein, 9.3% carbohydrate, 7.6% fat, and inorganic material reported as ash 1.4%.

Step 3

The intact hydrated cotyledons from Step 2 are then transferred to a tank and mixed with hot water, heated to near boiling (ca. 200° F.), and then milled in a Reitz-Type comminuting mill to form a slurry which is then homogenized in a two-stage homogenizer operated at 3,000 psig on the second stage to afford a maximum particle size of less than 100μ. Sufficient water is employed to yield a homogenized suspension having 10% solids. Little change in composition as to protein, carbohydrate, fat, or ash analysis occurs during this step.

Step 4

The effluent homogenized soybean suspension from Step 3 containing 10% by weight of solids is then fractionated in a disc-type desludging centrifuge into a primary soy lipid-protein concentrate and a sludge fraction comprising insoluble macrocarbohydrates and heavier particulate material. The suspension from Step 3 is diluted to 5% by weight of solids with water before it is fed to the centrifuge when using a pilot scale automatic de-sludger such as a Westfalia Separator series 205 at a bowl speed of about 10,000 rpm. Other centrifuges may require a feed-slurry having a different percentage of solids for optimal efficiency. The sludge fraction is discarded or used as an animal feed. The following tabulation compares the compositions of the feed slurry from Step 3 and the primary soy lipid-protein concentrate from this step. The protein yield based on the raw beans is 59.5% from U.S. soybeans, 61.1% from Brazilian soybeans and 58.9% from Indonesian soybeans.

Table E.

| Effect of Desludging on Nutrient Composition | | |
|---|---|---|
| | Soybean Suspension Step 3 | Primary Soy Lipid-Protein Concentrate Step 4 |
| Solids | 5.10% | 4.50% |
| Protein | 2.31% | 2.25% |
| Carbohydrate | 1.15% | 0.46% |
| Fat | 1.40% | 1.59% |
| Ash | 0.24% | 0.20% |
| Water | q.s. 100% | q.s. 100% |

Step 5

The primary soy lipid-protein concentrate from Step 4 is subjected to high-temperature short-time heat treatment at 280°-290° F. for a period of 30 seconds. This is most satisfactorily accomplished as a continuous unit process in a tubular apparatus employing direct steam injection. This improves the functionality of the soy lipid-protein concentrate with respect to reduced viscosity and sedimentation, and improved whiteness. The liquid soy lipid-protein concentrate may then be incorporated directly into food products, with or without prior evaporative concentration, or it may be dried and packaged for use as a food ingredient.

EXAMPLE 2 — SLUDGE REWORK

The standard process may be modified as follows to provide a higher protein recovery yield. Example 2 through Steps 1, 2, and 3 is repeated as described above. Step 4 is also conducted in the same fashion except that the sludge when discharged from the desludging centrifuge is diluted with water to 10% by weight of solids and resuspended by passage through a two-stage homogenizer as described in Step 3. The resuspended and homogenized sludge is then further diluted with water to 5% by weight of solids and desludged in the desludging centrifuge in the same fashion as in Step 4. In the meantime, the primary soy lipid-protein concentrate from Step 4 is retained in a holding tank and the secondary soy lipid-protein concentrate is combined therewith as it emerges from the desludging centrifuge from the sludge rework. The combined soy lipid-protein concentrate is then suitable for food use optionally with prior evaporative concentration or drying. The protein yield from the raw soybean charged to Step 1 is about 80% when employing U.S. soybeans.

EXAMPLE 3 — MODIFICATION WITH RETENTION OF BEAN HULLS

The process of Example 2 is modified by omission of Step 2 so that the following sequence is employed.

Step A — blanching
Step B — grinding and homogenization
Step C — centrifical fractionation
Step D — sludge rework
Step E — high-temperature short-time heat treatment The combined lipid-protein concentrate produced by this process consists of, on a percent by weight basis, solids 3.72%, protein 1.81, carbohydrate 0.41, fat 1.27, and inorganic constituents reported as ash 0.23. This represents a percentage recovery of whole bean constituents relative to the weight of soybeans charged to the process on a weight basis of solids 67.7, protein 80.1, carbohydrate 29.7, fat 114.5, and inorganic consituents reported as ash 77.4%.

What is claimed is:

1. A process for preparing a soybean lipid-protein concentrate for food use which comprises blanching whole soybeans by heating in dilute aqueous alkali near the boiling point for a period sufficient to inactivate lipoxygenase activity, grinding blanched soybeans in water to form a comminuted soybean slurry homogenizing said slurry to afford a homogenized suspension having a maximum suspended particle dimension of 100μ, and fractionating resulting suspension by centrifugation into a light liquid stream constituting a primary concentrate and a viscous sludge wherein the centrifugation conditions including G force, percent solids in feed suspension, and feed rate are selected so that resulting sludge contains from 20% to 60% by weight of the carbohydrate contained in said raw soybeans, said primary concentrate consituting desired soybean lipid-protein concentrate suitable for food use.

2. The process of claim 1 wherein said viscous sludge contains 30% to 40% of the carbohydrate contained in said raw soybeans.

3. The process of claim 1 wherein said freshly blanched soybeans are dehulled prior to grinding.

4. The process of claim 1 wherein said sludge is resuspended in water to form a sludge suspension, said sludge suspension is homogenized to form a homogenized sludge suspension, and said homogenized sludge suspension is fractionated by centrifugation into a light liquid stream constituting a secondary soybean lipid-protein concentrate and a viscous sludge containing soybean carbohydrates.

5. The process of claim 4 wherein said primary concentrate and said secondary concentrate are combined to provide desired soybean lipid-protein concentrate suitable for food use.

6. The process of claim 1 wherein said soybeans are blanched in hot dilute aqueous edible alkali solution.

7. The process of claim 6 wherein about 1.5 to 5.0 parts by weight of said alkali solution per part by weight of soybeans is employed at a temperature of 200°-212° F.

8. The process of claim 7 wherein said alkali solution has pH 12-13 and a period of about 15 minutes is employed.

9. The process of claim 1 wherein after blanching, said soybeans are drained, mixed with water, and ground, the amount of water being sufficient to form a comminuted soybean slurry containing 10% by weight of solids.

10. The process of claim 9 wherein said water is maintained at 200°-212° F. during grinding.

11. The process of claim 1 wherein said comminuted soybean slurry has a concentration of 10% by weight of solids when subjected to homogenization.

12. The process of claim 1 wherein said comminuted soybean slurry is heated to 200°-212° F. during homogenization.

13. The process of claim 1 wherein said homogenized suspension has a concentration of 5% by weight of solids when subjected to fractionation by centrifugation.

14. The process of claim 1 wherein centrifugation is conducted at about 2,000 to 12,000 xG.

15. The process of claim 14 wherein centrifugation is conducted at 70° F.

16. The process of claim 1 wherein said primary concentrate or said homogenized soybean suspension is subjected to high-temperature, short-time heat treatment at 220°-300° F. for 2.0 to 0.25 min.

17. The process of claim 16 wherein a temperature of 280°-290° F. for 30 sec. is employed.

18. The process of claim 4 wherein said primary concentrate and said secondary concentrate are combined and subjected to high-temperature, short-time heat treatment at 220°-300° F. for 2.0 to 0.25 min.

19. The process of claim 18 wherein a temperature of 280°-290° F. for 30 sec. is employed for said heat treatment.

20. The process of claim 1 wherein said homogenized suspension has a concentration of from 3% to 6% by weight of solids when subjected to fractionation by centrifugation.

21. The process of claim 1 wherein said homogenized suspension has a concentration of from 1% to 10% by weight of solids when subjected to fractionation by centrifugation.

22. A process for preparing a soybean lipid-protein concentrate for food use which comprises: (1) blanching intact whole soybeans with a dilute aqueous solution of an edible alkali at pH 12-13 and a temperature of about 200°-212° F. for about 15 min.; (2) draining said dilute aqueous solution from said soybeans, dehulling said soybeans, and separating the dehulled beans from the hulls; (3) suspending and grinding the moist dehulled beans in sufficient water at 200°-212° F. to yield a comminuted soybean slurry containing 10% by weight of comminuted soybeans; (4) homogenizing said comminuted soybean slurry in a mechanical homogenizer to provide a homogenized soybean suspension having a maximum particle dimension of 100μ; (5) diluting said suspension to 5% by weight total solids with water and removing sludge therefrom comprised of insoluble macrocarbohydrates and heavier particulate material by centrifuging at 2,000 xG to 10,000 xG in a continuous solid bowl centrifuge or a desludging centrifuge to yield a primary soybean lipid-protein concentrate comprised of a water suspension containing by weight about 5% total solids including about 2¼% protein, about ½% carbohydrate, about 1½% fat, and inorganic materials reported as ash of less than about ¼%; wherein said homogenized soybean suspension or said soybean lipid-protein concentrate is subjectd to heat treatment at 220°-300° F. for 2.0 min. to 0.25 min. followed by immediate cooling to less than 200° F.

23. The process of claim 22 wherein said sludge removed in (5) is (a) mixed with sufficient water to form a sludge suspension containing about 10% by weight of solids, (b) homogenized to yield a homogenized sludge suspension, (c) diluted with water to a solids content of 5% by weight, (d) centrifuged at 2,000 xG to 10,000 xG in a continuous solid bowl centrifuge or a desludging centrifuge to yield a secondary soybean lipid-protein concentrate as centrifugate, and (e) said secondary soybean lipid-protein concentrate is combined with said primary soybean lipid-protein concentrate produced in (5) of Claim 21 to yield a combined soybean lipid-protein concentrate.

24. The process of claim 23 wherein said combined soybean lipid-protein concentrate is subjected to heat treatment at 220°-300° F for 2.0 min. to 0.25 min. followed by immediate cooling to less than 200° F.

25. The process for preparing a soybean lipid-protein concentrate for food use which comprises (1) blanching intact whole soybeans with a dilute aqueous solution of an edible alkali at pH 12-13 and a temperature of about 200°-212° F. for about 15 min.; (2) thereafter suspending and grinding the moist soybeans in sufficient water at 200°-212° F. to yield a comminuted soybean slurry containing 10% by weight of comminuted soybeans; (3) homogenizing said comminuted soybean slurry in a mechanical homogenizer to provide a homogenized soybean suspension having a maximum particle dimension of 100μ; (4) diluting said suspension to 5% by weight total solids with water and removing sludge therefrm comprised of isoluble macrocarbohydrates and heavier particulate material by centrifuging at 2,000 to 10,000 xG in a continuous desludging centrifuge to yield a primary soybean lipid-protein concentrate; (5) resuspending said sludge in water to form a sludge suspension containing about 10% by weight of solids, homogenizing said suspension, diluting said suspension with water to a concentration of 5% by weight of solids, removing sludge therefrom by centrifuging at 2,000 xG to 10,000 xG in a continuous solid bowl centrifuge or a desludging centrifuge to yield a secondary soybean lipid-protein concentrate; (6) combining said primary soybean lipid-protein concentrate and said secondary soybean lipid-protein concentrate to form a combined soybean lipid-protein concentrate; wherein at least one of (a) said homogenized soybean suspension, (b) each of said primary and said secondary soybean lipid-protein concentrates, or (c) said combined soybean lipid-protein concentrate is subjected to heat treatment at 200°-300° F. for 2.0 to 0.25 min. followed by immediate cooling to less than 200° F.

26. The product produced by the process of claim 2.
27. The product produced by the process of claim 21.
28. The product produced by the process of claim 24.

* * * * *

UNITED STATES PATENT OFFICE
CERTIFICATE OF CORRECTION

Patent No. 4,039,696                Dated     August 2, 1977

Inventor(s) Robert F. Marquardt, Grant H. Hartman, Jr., and Kenneth C. Goodnight, Jr.

It is certified that error appears in the above-identified patent and that said Letters Patent are hereby corrected as shown below:

Claim 26, delete "2" and insert --1--.

Claim 27, delete "21" and insert --22--.

Claim 28, delete "24" and insert --25--.

Signed and Sealed this

Twenty-fifth Day of October 1977

[SEAL]

Attest:

RUTH C. MASON
Attesting Officer

LUTRELLE F. PARKER
Acting Commissioner of Patents and Trademarks